United States Patent
Mast

[15] 3,697,851
[45] Oct. 10, 1972

[54] REGULATING CONVERTER CIRCUIT
[72] Inventor: Robert E. Mast, Woodland Park, Colo.
[73] Assignee: Hewlett-Packard Company, Palo Alto, Calif.
[22] Filed: Dec. 14, 1970
[21] Appl. No.: 97,842

[52] U.S. Cl. ..................321/2, 321/18, 321/25, 323/17
[51] Int. Cl. ....................H02m 3/32, G05f
[58] Field of Search.......321/2, 18, 25; 323/17, 22 T, 323/DIG. 1; 331/113 A

[56] References Cited

UNITED STATES PATENTS

| | | | |
|---|---|---|---|
| 3,273,050 | 9/1966 | Pratt | 323/DIG. 1 |
| 3,452,268 | 6/1969 | Grossoehme | 321/25 X |
| 3,074,031 | 1/1963 | Hoge | 331/113 A |
| 3,161,837 | 12/1964 | Lloyd | 321/2 X |
| 3,461,377 | 8/1969 | Reese | 323/17 X |
| 3,518,526 | 6/1970 | Genuit | 321/2 |

FOREIGN PATENTS OR APPLICATIONS

| | | | |
|---|---|---|---|
| 1,928,359 | 12/1969 | Germany | 321/2 |

Primary Examiner—William H. Beha, Jr.
Attorney—A. C. Smith

[57] ABSTRACT

An improved high-efficiency D.C.-to-D.C. converter circuit uses a single transistor to provide both D.C. level conversion and output regulation. A control winding on a saturable core inductor alters the recycle time of the converter to control the level of magnetic flux in an output transformer per cycle of operation.

2 Claims, 2 Drawing Figures

PATENTED OCT 10 1972

3,697,851

INVENTOR
ROBERT EARL MAST

BY  R. C. Smith

ATTORNEY

3,697,851

REGULATING CONVERTER CIRCUIT

BACKGROUND AND SUMMARY OF THE INVENTION

Certain known D.C.-to-D.C. converter circuits which use a pair of transistors connected to operate substantially in push-pull manner commonly have poor efficiency because of the turn on and turn off losses introduced in each operating cycle by the two transistors. More importantly, since the saturable core of such known converter circuits is driven between oppositely-poled limits of saturation flux, such converters may not be controlled conveniently without altering the operating wave shapes, and the like.

Accordingly, the present invention uses only a single transistor and a saturable core inductor in a circuit which operates between one limit of saturation flux in the saturable core and a controllable lower limit of flux. Control current in an auxiliary winding on the inductor establishes the lower flux limit and thereby controls time of conduction of the single transistor. The output signal level is thus controlled in response to the conduction time of the transistor.

DESCRIPTION OF THE PREFERRED EMBODIMENT

Figure 1:
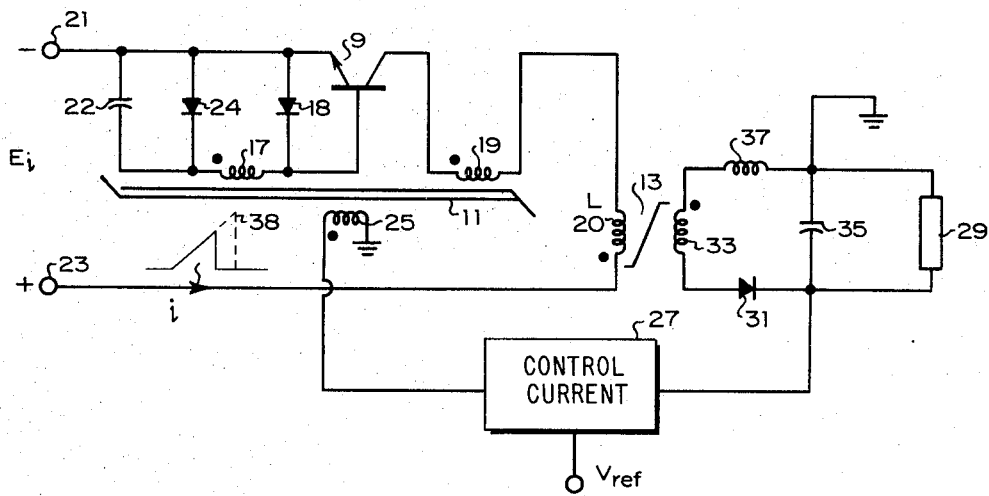
FIG. 1 is a schematic diagram of the preferred embodiment of the present converter circuit.
Figure 2:
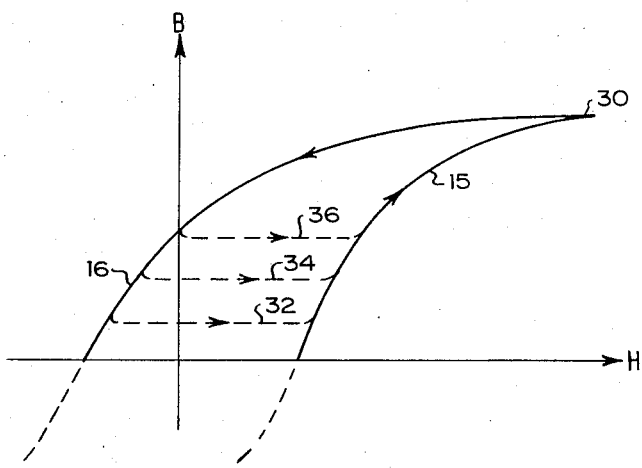
FIG. 2 is a graph showing the operating flux levels in the saturable inductor in the circuit of FIG. 1.

Referring now to the schematic diagram of FIG. 1 and to the graph of FIG. 2, there is shown a preferred embodiment of the present converter circuit using a single transistor 9 and two separate inductive elements 11 nd 13. The inductive element 11 includes a saturable core which has a B-H characteristic 15 as shown in FIG. 2 and the core of inductive element 13 is selected to have high limits of saturation flux so that it cannot saturate during normal operation. The inductive element 11 includes a pair of windings 17 and 19, the latter one of which is serially connected with the emitter-collector circuit of transistor 9 and the primary winding 20 of element 13 between the terminals 21, 23 of a D.C. power source. In addition, element 11 includes a control winding 25 which is coupled to a source 27 of control current for altering the conduction time of transistor 9 and thereby regulating the output to utilization circuit 29. The turns ratios of windings 17, 19 and 25 of element 11 are typically in the ratios of 5 to 1 to 5, respectively.

In operation, the circuit of FIG. 1 receives a D.C. signal (or a slowly varying signal) at terminals 21 and 23 and supplies a rectified steady D.C. signal, typically at a different level, to a utilization circuit 29. Initially, current flows in the series circuit of winding 20 (element 13), winding 19 and the collector-emitter circuit of transistor 9. The voltage induced in winding 17 is with a polarity that, when applied through capacitor 22 and diode 24 across the base-emitter junction of transistor 9, tends to turn the transistor on hard. The voltage drops across the conducting transistor 9 and across winding 19 are very small so that substantially the entire input voltage across terminals 21, 23 appears across winding 20. The current i builds up substantially linearly with time in accordance with the relationship:

$$E_i = L_{20} \times (di/dt)$$

The rectifying diode 31 connected to the secondary winding 33 of element 13 is poled to remain back biased during the change of input current i with time so the element 13 (which does not saturate) stores energy at a level proportional to $\frac{1}{2} L_{20} i^2$.

At some instant during the build up of input current i, the core of element 11 saturates (as shown in FIG. 2), thereby decoupling windings 17 and 19 and turning off transistor 9 and abruptly terminating current flow through winding 20. This produces an abrupt polarity reversal across winding 33, thereby allowing the energy stored in the element 13 to be transferred to the output capacitor 35 through forward-biased diode 31 and inductor 37. At the same time, an abrupt polarity reversal also occurs across winding 17 of element 11, thereby forward biasing diode 18 and permitting the energy stored in element 11 to establish current flow through diode 18 and the capacitor 22. The flux level in the core of element 11 is thus decreased from the saturation level 30 to a lower level that is determined by the control winding 25. Current flowing in this winding (i.e. flowing in at the dot end, as shown) biases the core (level 32 in FIG. 2) opposite to that established by current flow in winding 19. In the absence of control current, the core of element 11 may be reset to level 34 which is below the saturation flux limit 30 and which corresponds to voltage stored by capacitor 22 that again turns on transistor 9 for another complete cycle of operation.

Resetting the core of element 11 to different flux levels 32-36 below the saturation flux limit 30 alters the time during which transistor 9 conducts the steadily-increasing current i and the level of current i at which current flow is interrupted thus determines the voltage across output capacitor 35. This output voltage may be compared with a reference voltage $V_{ref}$ in a suitable source 23 of control current such as an amplifier 27, or the like, to supply control current to winding 25 of element 11. For longer conduction time, the current i attains a higher level 38 thereby establishing a higher output voltage across capacitor 35. In this way, the circuit of the present invention converts a D.C. signal at input 21, 23 to an output D.C. signal across capacitor 35 and also provides output regulation to compensate for changes in the input voltage, the output voltage and the output current.

I claim:

1. A converter circuit comprising:

a gain element having a plurality of electrodes providing an output conduction circuit between a first and a second of said electrodes and providing a conduction control circuit between a second and a third of said electrodes, the output conduction circuit of said gain element being only unidirectionally conductive in response to signal of one polarity applied to said conduction control circuits;

an inductive element including a plurality of windings disposed on a saturable core;

a utilization circuit;

means connecting the output conduction circuit of said gain element, said utilization circuit and one of the windings of said inductive element in series circuit to receive an applied signal;

circuit means connecting another of said windings of said inductive element to said conduction control circuit for alternating the conductivity of the gain element, said circuit means including a first diode connected between said second and third electrodes of the gain element with a conduction polarity which conducts current in response to signal of polarity opposite to said one polarity applied to the conduction control circuit;

a source of control signal; and means coupling the source of control signal to a third one of the windings on said inductive element for operatively establishing a control level of flux in the saturable core of said inductive element to control the conduction period of said gain element.

2. A converter circuit comprising:

a gain element having a plurality of electrodes providing an output conduction circuit between a first and a second of said electrodes and providing a conduction control circuit between a second and a third of said electrodes, the output conduction circuit of said gain element being only unidirectionally conductive in response to signal of one polarity applied to said conduction control circuit;

an inductive element including a plurality of windings disposed on a saturable core;

a utilization circuit including a transformer having a primary winding and having a secondary winding magnetically coupled to said primary winding;

a rectifier connected to said secondary winding and poled to be back biased in response to signal appearing thereacross during conduction of current through the output conduction circuit of said gain element;

means connecting the output conduction circuit of said gain element, the primary winding of the transformer in said utilization circuit and one of the windings of said inductive element in series circuit to receive an applied signal;

circuit means connecting another of said windings of said inductive element to said conduction control circuit for alternating the conductivity of the gain element, said circuit means including a first diode connected between said second and third electrodes of the gain element with a conduction polarity which conducts current in response to signal of polarity opposite to said one polarity applied to the conduction control circuit;

a source of control current including a comparator having an input connected to a source of reference signal and having another input connected to receive the rectified signal from the secondary winding of said transformer for producing a control signal which is indicative in magnitude and polarity of the difference between the signals applied to the inputs of the comparator; and means coupled to apply said control signal to a third one of the windings on said inductive element for operatively establishing a control level of flux in the saturable core of said inductive element to control the conduction period of said gain element.

* * * * *